United States Patent Office 2,875,217
Patented Feb. 24, 1959

2,875,217

PRODUCING 17-HYDROXY 20-KETO STEROIDS BY THE USE OF OSMIUM TETROXIDE AND AN ORGANIC POLYVALENT IODO OXIDE

William P. Schneider, Kalamazoo Township, Kalamazoo County, Mich., assignor to The Upjohn Company, Kalamazoo, Mich., a corporation of Michigan No Drawing. Application July 14, 1954
Serial No. 443,418

20 Claims. (Cl. 260—397.45)

This invention relates to the production of steroids, and more particularly to the production of 17-hydroxy-20-keto steroids by the oxygenation of $\Delta^{17(20)}$-steroids with osmium tetroxide and an organic polyvalent iodo oxide.

It is an object of the present invention to provide a process for producing 17-hydroxy-20-keto steroids by the oxygenation of a $\Delta^{17(20)}$-steroid as defined hereinafter with osmium tetroxide and an organic polyvalent iodo oxide. Another object is the provision of an improved process for the production of cortisone, hydrocortisone, 11-epihydrocortisone, and 17-hydroxy-11-desoxycorticosterone and their esters. A further object is to provide a process which gives an improved ultimate yield of 17-hydroxy-20-keto steroids. A further object is to provide a process which gives an improved yield of 17-hydroxy-20-keto steroid per unit of reaction time. A further object is to provide a process which gives an improved yield of the desired 17-hydroxy-20-keto steroid per unit of osmium tetroxide. Still another object is to provide an improved process for the production of 17α-hydroxy-20-keto-21-acyloxy steroids of the pregnane series. Other objects will be apparent to those skilled in the art to which this invention pertains.

The objects of the present invention are achieved by oxygenating a $\Delta^{17(20)}$-steroid with osmium tetroxide and an organic polyvalent iodo oxide all as defined hereinafter. Under these conditions a higher yield of 17α-hydroxy-20-keto steriod is obtained, complete reaction is obtained in a shorter reaction time and the amount of osmium tetroxide necessary to achieve high yields of desired product is lower than the processes already known in the art.

The use of osmium tetroxide to convert a double bonded compound into a glycol is a well known reaction. In this reaction, the osmium tetroxide adds to the double bond to form a cyclic osmate ester, which upon hydrolysis, usually with aqueous sodium sulfite, yields a glycol. This reaction has been applied to steroids in U. S. Patents 2,265,143; 2,275,790; 2,492,194; and 2,493,780 where side chain unsaturated pregnane steroids are oxygenated with usually an equimolar amount of osmium tetroxide, followed by hydrolysis with aqueous sodium sulfite, to produce a glycol steroid. U. S. Patent 2,493,780 also discloses that hydrogen peroxide can be used with a catalytic amount of osmium tetroxide. Similar hydroxylation reactions involving a double bonded compound, hydrogen peroxide and a catalytic amount of a metal oxide, may be found in U. S. Patents 2,373,942; 2,402,566; 2,414,385; and 2,437,648.

The oxygenation of unsaturated steriods of the pregnane series with osmium tetroxide and certain oxidizing agents is also known in the art. Prins and Reichstein, Helv. Chim. Acta, 25, 300 (1942) report that oxidation of the cyclic osmate ester of a side chain unsaturated steroid with chloric acid gives a hydroxy-keto steroid as well as the glycol steroid produced when the osmate ester is hydrolyzed with aqueous sodium sulfite. Miescher and Schmidlin, Helv. Chim. Acta, 33, 1840 (1950) substituted hydrogen peroxide for the chloric acid as the oxidizing agent of the steroidal osmate ester and in U. S. Patent 2,668,816 disclosed that alkyl peroxides and peracids could be used also. This reaction, however, gives extremely poor yields per unit time, requiring from about 48 to 96 hours or more to reach a maximum yield of about 48 percent. Miescher and Schmidlin disclosed in U. S. Patent 2,662,854 that the reaction is catalyzed by light, but even so, the increase in the velocity of the reaction is slight. Their examples, for instance, show reaction times ranging from twenty to 48 hours or more.

TABLE I

|  | Oxidizing Agent | Ratio of Steroid to OsO$_4$ | Ratio of Product to By-product | Reaction Time (Hours) | Yield of Product |
|---|---|---|---|---|---|
| Prins and Reichstein | chloric acid | 1:1 | 1.45:1 | 72 | less than 25 percent. |
| Miescher and Schmidlin | H$_2$O$_2$, alkyl peroxides, peracids. | 14:1 | 1.8:1 | 20–80 | 48 percent. |
| This invention | organic polyvalent iodo oxide. | as high as 1000:1. | 3.6:1 | 1–10 | more than 60 percent. |

Table I illustrates the differences between the oxygenations of the prior art and the oxygenation of this invention. When following the process of this invention, the weight ratio of starting steroid to osmium tetroxide is much higher than that of the processes of the prior art, the ratio of product to by-product is higher, and the reaction time less. Moreover, the yield of hydroxy-keto steroid is increased up to forty percent over the best yield reported in the prior art. Whereas the reaction of a $\Delta^{17(20)}$-steroid with osmium tetroxide and hydrogen peroxide is a sluggish reaction which requires at least twenty hours or more to reach completion, the reaction of a $\Delta^{17(20)}$-steroid with osmium tetroxide and an organic polyvalent iodo oxide is normally substantially complete in less than about eight hours and sometimes in less than two hours. Although a longer reaction time than two hours is sometimes needed, even so, the overall time rarely will exceed eight hours.

When following the process of this invention, it is not necessary to employ light as a reaction catalyst, since the reaction proceeds with equal facility in complete darkness. It has been found, however, that the addition of pyridine or like aromatic tertiary-N-heterocyclic amine to the reaction mixture sometimes catalyzes the reaction. The addition of this pyridine or like aromatic-N-heterocyclic amine, e. g., collidine, picoline, lutidine, appears to improve somewhat the yield of desired product and the reaction rate can sometimes be accelerated in its presence. The addition of about one to ten molar equivalents or so of pyridine, calculated on the starting steroid, is usually sufficient to obtain any catalytic effect.

The oxidizing agents employed in the process of this invention and referred to herein as organic polyvalent iodo oxides are organic iodo compounds having at least one titratable oxygen atom attached to the iodine atom.

The presence of a titratable iodo oxide oxygen atom can be determined in the usual manner with KI, acid and sodium thiosulfate. The known examples of these iodo oxides are iodoso, iodyl and iodoxy compound and salts thereof. The iodonium compounds are not included in the term "iodo oxides" as used herein since the hydroxy group of the iodonium compounds is ionic in nature and is not therefore directly attached to the iodine atom, but merely associated with it ionically. The iodoso compounds have one oxygen atom attached to the iodine atom; the iodoxy compounds have two oxygen atoms attached.

An excellent reference to these iodo oxides is Willgerodt, "Die Organischen Verbindungen Mit Mehrwertigem Jod," F. Enke, Stuttgart (1914). Many iodo oxides are disclosed in this reference. Other references include R. Sandin, "Organic Compounds of Polyvalent Iodine," Chem. Rev., 32, 249 (1943); Sidgwick, "Chemical Elements and Their Compounds," vol. II, 1243–1260, Oxford Univ. Press (1950); and Mason et al., J. Chem. Soc., 1935, 1669. The latter reference discloses the iodyl compounds.

From these references, it appears that iodo oxides can be prepared from aryl iodo compounds or other vinyl iodides whose double bond is also modified in some way, e. g., by halogenation, as in α-chloro-iodo-ethylene, chloro-iodofumaric acid or α-chloro-iodo-acrylic acid.

Examples of the known aryl iodo oxides include iodosobenzene, phenyliodosoacetate, diphenyliodyl hydroxide and acetate phenyliodosopropionate, iodoxybenzene, the ring alkylated iodoso and iodoxybenzenes, and the oxides of iodonaphthylene, iodobenzoquinone and iodoanthroquinone, iodobenzoic acid, iodobenzenesulfonic acid, iodobenzaldehyde, iodobenzophenone, iodosalicylic acid, etc.

The preferred organic polyvalent iodo oxides employed in the process of the present invention are the carbocyclic aryl iodo oxides. Of these the aryl iodoso compounds are preferred, e. g., iodosobenzene and phenyliodosoacetate, which have been found to give especially good results. The iodoxy compounds, for the most part, are very insoluble in organic solvents, and therefore do not usually give as satisfactory results as the corresponding iodoso compounds with respect to reaction rate and/or yield of 17-hydroxy-20-keto product.

The preferred aryl iodoso compounds are ordinarily prepared by the reaction of any aryl iododichloride with a base, e. g., sodium hydroxide. The aryl iodoso acid salts can be prepared by the reaction of an aryl iodide with the selected organic peracid. The iodoxy compounds are prepared by boiling the corresponding iodoso compounds in water or by oxidizing an aryl iodide with, for example, Caro's acid. The iodyl hydroxides are prepared by the reaction of an aryl iodoxy compound with two molar equivalents of sodium hydroxide in a one normal aqueous solution of sodium hydroxide at zero degrees centigrade for about 1.5 hours. See Mason (loc. cit.) The salts of aryl iodyl hydroxy compounds are prepared by precipitating the aryl iodyl hydroxide as the carbonate and reacting the carbonate with the selected acid.

In carrying out the process of the invention, the starting steroid is advantageously dissolved in an inert organic solvent, for example, tertiary butyl alcohol, diethyl ether, tetrahydrofuran, or the like, and the osmium tetroxide and the organic polyvalent iodo oxide mixed therein. The osmium tetroxide can be added before or after the addition of the organic polyvalent iodo oxide. Advantageously, the osmium tetroxide and the organic polyvalent iodo oxide are added in solutions of the same solvent used as the vehicle used for the reaction.

The amount of osmium tetroxide employed in the reaction can be varied widely, for example, from 0.2 molar equivalent to 0.001 molar equivalent. Advantageously, however, not more than 0.05 molar equivalent is used. When the amount of osmium tetroxide employed is between 0.001 and 0.05 molar equivalents, it is possible to obtain high yields of desired product and to remove the residual osmium tetroxide with ease, e. g., by treating the reaction product with an osmium tetroxide precipitant, such as sodium sulfite, without heating or without mixing for a long period of time. In this way, a high yield of product of improved color and composition is obtained without substantial deacylation of any acyloxy group.

The amount of organic polyvalent iodo oxide theoretically required to produce a 17-hydroxy-20-keto steroid is two oxidation equivalents for each mole of osmate ester formed in the reaction. It has been found, however, that in the process of this invention, somewhat more than the theoretical amount of organic polyvalent iodo oxide is sometimes necessary to obtain a complete reaction. For optimum results in the process of this invention, therefore, it is usually necessary to use an organic polyvalent iodo oxide in excess of the theoretical amount. For example, optimum results are ordinarily obtained using between about 2.2 and about 2.75 oxidation equivalents of organic polyvalent iodo oxide, calculated on the starting steroid. When less iodo oxide is used, the yield is usually impaired through incomplete reaction. Higher amounts of iodo oxide than about 2.75 molar equivalents may be used, in many cases without impairing the yield, but higher amounts are usually undesirable, especially where a 3-keto-$\Delta^{4,17(20)}$-21-acyloxy steroid is to be oxygenated while keeping the $\Delta^4$-3-keto group intact. It has been observed with such steroids that large excesses of iodo oxide sometimes tend to degrade the A ring, unless the excess is destroyed before it reacts, thus causing a secondary reaction which impairs the overall yield of desired $\Delta^4$-3,20-diketo-17α-hydroxy-21-acyloxy steroid.

If desired, the iodo oxide can be added slowly to the steroid and osmium tetroxide mixture, e. g., over a period of several minutes to several hours. However, in most cases, the iodo oxide can be added all at once at the beginning of the reaction, with no adverse effect upon the yield of desired product. The course of the oxygenation reaction can be readily determined by the titration of aliquot portions for residual iodo oxide.

The reaction temperature normally is between about fifteen and about thirty degrees centigrade although higher or lower temperatures are operable, e. g., between about minus ten and about plus seventy degrees centigrade. For convenience, room temperature is ordinarily employed. Optimum yields of desired product are usually obtained at room temperature also. However, when a particularly small proportion of osmium tetroxide is employed in the reaction, e. g., below about 0.002 molar equivalent, calculated on the starting steroid, a reaction temperature somewhat above room temperature, e. g., 45 degrees centigrade, may be desirable.

In place of the solvents noted above, there may be used any inert solvent which is a solvent for the reagents. Suitable solvents include diethylether, dioxane, tetrahydrofuran, tertiary butyl alcohol, tertiary amyl alcohol, ethanol and methanol. Advantageously, the solvent is preferably one boiling low enough so that it can be removed from the reaction product by distillation under reduced pressure at or below room temperature.

For the most part, the addition of relatively small amounts of water, on a volume basis, to the reaction mixture does not reduce materially the yield of 17α-hydroxy-20-keto steroid, although theoretically the production of 17,20-glycol by-product in the reaction mixture should be in direct relationship to the water present. The moisture present in most reactions, unless the reaction is performed under anhydrous conditions, is sufficient to produce significant amounts of more polar by-product, i. e., from about fifteen to 35 percent. This yield, however, does not appear to be materially affected by the addition of more water to the reaction.

Another by-product of the oxygenations of the present invention are 17-keto steroids. These steroids, however, appear to be the product of the reaction of the 17,20-glycol by-product with the iodo oxide employed as oxidizing agent. The yield of by-product is therefore reported as the yield of "more polar product" and represents the combined yield of glycol and 17-keto steroids since the 17-keto steroids are apparently the oxidation product of some of the glycol produced in the reaction.

Water does, however, appear to be necessary for satisfactory results when an aryl iodosoacylate, at least an aryl iodosoacetate, is employed as the oxidizing agent. In one reaction, when no water was added, the reaction had not proceeded to one-half of completion within 48 hours. In this instance, the addition of at least a molar equivalent of water, calculated on the aryl iodosoacylate, was found to be advantageous, since, when water was added, the reaction proceeded at the normal rate.

The starting steroids for the process of this invention in its broader aspects are $\Delta^{17(20)}$-steroids having a 20-hydrogen atom and a 21-carbon atom. These $\Delta^{17(20)}$-steroids are converted, when reacted with osmium tetroxide and an organic polyvalent iodo oxide according to the process of this invention, into 17α-hydroxy-20-keto steroids. The term "steroid" as defined herein refers to cyclopentanopolyhydrophenanthrenes. Included in such steroids are those having a 17-ethylidene, propylidene, alkylidene, β-bromoethylidene, β-alkoxyethylidene, e. g., β-methoxyethylidene, β-hydroxyethylidene, β-acyloxyethylidene, e. g., β-acetoxyethylidene, β-chlorethylidene, carboalkoxymethylidene, e. g., carbomethoxymethylidene, etc., side chain. Advantageously, the cyclopentanopolyhydrophenanthrene radical and the acyl radical are both free of substituents or groupings which are affected by osmium tetroxide under the conditions of the process. A preferred type of starting steroid is either saturated or contains only $\Delta^4$ unsaturation coupled with a 3-keto group. Similarly it is of advantage if the preferred starting steroids contain only saturated acyl groups because double bonds, whether in the nucleus or in the acyl radical, sometimes are also affected by the osmium tetroxide and organic polyvalent iodo oxide. In addition the nucleus of the starting steroid can advantageously have a hydroxy, keto, acyloxy, hydrocarbonoxy, e. g. methoxy, octyloxy, etc., benzyloxy, halogen, or oxido group or groups at the 3, 6, 9, 11 and 12 or other positions of the nucleus and the angular methyl groups attached to carbon atoms 10 and 13 each or both may be present or absent. The process of this invention, however, being an improvement in prior processes for oxygenating $\Delta^{17(20)}$-steroids to 17-hydroxy-20-keto steroids is, in its broader aspects, broadly applicable to oxygenation of any $\Delta^{17(20)}$-steroid having a 20-hydrogen atom and a 21-carbon atom, to a 17α-hydroxy-20-keto steroid.

Of the starting steroids of the present invention, the $\Delta^{17(20)}$-21-acyloxy steroids of the pregnane series, as defined above, are preferred. These steroids may be represented by the following formula:

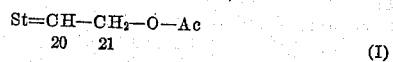

$$St=CH-CH_2-O-Ac$$
$$\quad\quad 20\quad 21$$
(I)

wherein Ac represents the acyl radical or an organic carboxylic acid, preferably containing from one to eight carbon atoms, inclusive, especially the acyl radical of a lower-aliphatic carboxylic acid, particularly acetic acid, and wherein St represents a cyclopentanopolyhydrophenanthrene radical attached to the above-identified side chain by a double bond at carbon atom 17. Of these preferred starting steroids, viz., $\Delta^{17(20)}$-21-acyloxy steroids of the pregnane series, especially preferred are the 3-oxygenated-$\Delta^{17(20)}$ - 21 - acyloxy pregnane series steroids, e. g., 3α- and 3β-hydroxy-21-acetoxy-17(20)-pregnene, 3α,21- and 3β,21-diacetoxy-17(20)-pregnene, 3α,11β- and 3β,11β-dihydroxy-21-acetoxy - 17(20) - pregnene, 21-acetoxy-17(20) - pregnene - 3 - one, 21 - acetoxy- 17(20) - pregnene - 3,11 - dione, 11β - hydroxy - 21- acetoxy - 4,17(20) - pregnadiene - 3 - one, 11α - hydroxy - 21 - acetoxy - 4,17(20) - pregnadiene - 3 - one, 21-acetoxy - 4,17(20) - pregnadiene - 3 - one, acetoxy - 4,9(11), -17(20) - pregnatriene - 3 - one, and other 21-acyloxy esters of the above-named compounds and the like wherein the 21-acyloxy group is, for example, formyloxy, acetoxy, propionyloxy, butyryloxy, dimethylacetoxy, trimethylacetoxy, valeryloxy, hexanoyloxy, octanoyloxy, β-cyclopentylpropionyloxy, diethylacetoxy, benzoxy, phenylacetoxy, phenylpropionyloxy, succinoyloxy, phthaloyloxy, or the like. Outstandingly useful starting steroids are those which may be represented by the following formula:

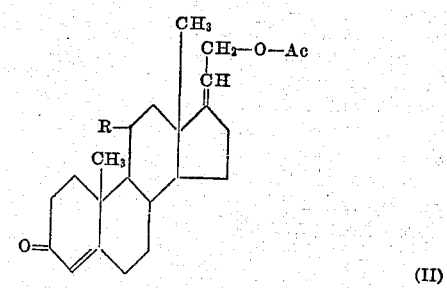

(II)

wherein Ac is the acyl radical of an organic carboxylic acid, preferably a lower-aliphatic acid, especially acetic acid, and wherein R is a hydrogen atom, α-hydroxyl, β-hydroxyl, or ketonic oxygen (=O), since these steroids can be readily converted, utilizing the process of the present invention into the physiologically active cortical hormones cortisone (Kendall's Compound E) and hydrocortisone (Kendall's Compound F). For example, reacting 21-acetoxy-4,17(20)-pregnadiene - 3,11 - dione with osmium tetroxide and an organic polyvalent iodo oxide according to the method of the present invention produces cortisone acetate. Similarly, 11β-hydroxy-21-acetoxy - 4,17(20) - pregnadiene - 3 - one is converted in the same manner to 11β,17α-dihydroxy-21-acetoxy-4-pregnene - 3,20 - dione (hydrocortisone acetate). 11α-hydroxy-21-acetoxy - 4,17(20) - pregnadiene - 3 - one is similarly converted to 11α,17α-dihydroxy - 21 - acetoxy- 4-pregnene - 3,20 - dione which is readily oxidized with chromic acid to cortisone acetate (U. S. Patent 2,602,769 of Murray and Peterson, issued July 8, 1952) and 21-acetoxy - 4,17(20) - pregnadiene - 3 - one is similarly converted to the physiologically active 17α-hydroxy-21-acetoxy-4-pregnene - 3,20 - dione. Since many physiologically active steroids possess a 17α-hydroxy - 20 - keto grouping, the process of the present invention provides an effective method of converting $\Delta^{17(20)}$-steroids into steroids possessing at least part of the requisite structure necessary to produce a physiologically active steroid. Since many synthetic methods are known in the art for the introduction of a $\Delta^4$-3-keto group and the introduction of an 11-oxygen atom into the steroid nucleus and for the removal of inactivating groups from the nucleus, other steroids besides those represented by Formula II are readily convertible, via the process of the present invention, into physiologically active steroids.

Starting $\Delta^{17(20)}$-21-acyloxy steroids for the process of the invention can be produced in several ways. For example, the Dimroth reaction [Dimroth, Berichte, 71B, 1334 (1938)] applied to 17β-hydroxy-20-pregnene steroids produces 21-hydroxy-, 21-acetoxy-, or 21-bromo- 17(20)-pregnene steroids which can be converted to other 21-acyloxy steroids according to methods known in the art [see Serini, British 213,630, Berichte, 71B, 1313, 1362 (1938); U. S. 2,267,258; 2,305,727; British 467,790; Miescher et al., Helv. Chim. Acta, 22, 120, 894 (1939); Ruzicka and Mueller, Ibid., 22, 416, 755 (1939)]. Alternatively, these starting compounds can be produced by the methods disclosed hereinafter and in copending application Serial No. 307,385 of Hogg, Lincoln, and Beal, filed August 30, 1952, now U. S. 2,774,776. The prior art processes produce the 17(20)-trans isomer whereas the process of Hogg, Lincoln and Beal produces predominantly the 17(20)-cis isomer.

Since it is ordinarily advantageous to separate the osmium from the steroidal reaction product, the reaction mixture is usually treated with an agent capable of removing the osmium, e. g., sodium sulfite, hydrogen sulfide, or the like, to precipitate the osmium as free osmium or as an insoluble salt of the added anion. The common procedure heretofore has been to heat the reaction mixture with aqueous sodium sulfite at elevated temperatures, e. g., the refluxing temperature of the mixture. Under these conditions, an acetate group in the reaction product is at least partially hydrolyzed and reacetylation is necessary to produce a completely acetylated reaction product.

When following the preferred conditions of the present invention, the reaction product is mixed with aqueous sodium sulfite at about room temperature or lower to remove the osmium from the reaction mixture. Under these conditions, an acetate or other readily hydrolyzable ester group in the molecule is maintained intact and the reesterification step necessary when following the procedure of the prior art is not needed. Enhanced yield of steroidal product is thereby obtained.

When a low concentration of osmium tetroxide in the reaction mixture, e. g., less than about 0.05 and sometimes as low as 0.001 molar equivalent, calculated on the starting steroid, is used an insignificant amount of the reaction product is tied up as an osmate ester at the end of the reaction. Hence, if the presence of osmium is not undesirable in the reaction mixture, the hydrolysis step may be eliminated when employing the preferred low concentrations of osmium tetroxide in the reaction mixture, further enhancing the simplicity of the reaction. The extremely slow reaction obtained when performing the reaction of the prior art ordinarily prohibits the use of these low concentrations of osmium tetroxide. Since the supply of osmium tetroxide is somewhat limited and osmium tetraoxide is toxic and dangerous, the use of these very low concentrations facilitates the adaption of the process to large scale reactions.

The following examples are illustrative of the process of the present invention but are not to be construed as limiting.

PREPARATION 1

*3,11 - diketo - 4,17(20)-pregnadiene - 21 - oic acid methyl ester*

To a mixture of 6.4 milliliters of methanolic sodium methoxide, 0.90 milliliter of absolute ethanol, and forty milliliters of dry benzene, which had previously been distilled until sixteen milliliters of distillate had been collected and the mixture then cooled, was added 4.6 milliliters of ethyl oxalate and a solution of 6.56 grams of 11-ketoprogesterone in 76 milliliters of dry benzene. The solution became turbid and a yellow precipitate formed. The reaction mixture was stirred for ninety minutes and 110 milliliters of ether was then added thereto and stirring was continued for sixty minutes followed by the addition of a 260-milliliter portion of ether. The thus-formed yellow precipitate of the sodium enolate of 21-ethoxyoxalyl-11-ketoprogesterone was filtered, washed with several fifty-milliliter portions of ether and after drying weighed 7.30 grams. The ether washings contained 1.08 grams of unreacted 11-ketoprogesterone. The yield of the sodium enolate of 21-ethoxyoxalyl-11-ketoprogesterone was 81 percent of the theoretical or practically quantitative calculated on the reacted 11-ketoprogesterone. The presence of a sodium enolate was verified by the extreme solubility of the product in water and by a positive ferric chloride test for enols as exhibited by the formation of a bright red color when the product was dissolved in alcoholic and aqueous ferric chloride solutions.

The sodium enolate of 11α-hydroxy-21-ethoxyoxalyl-progesterone, the sodium enolate of 11β-hydroxy-21-ethoxyoxalylprogesterone, the sodium enolate of 11α-acetoxy-21-ethoxyoxalylprogesterone, and the sodium enolate of 21-ethoxyoxalylprogesterone, respectively, are prepared by substituting 11α-hydroxyprogesterone, 11β-hydroxyprogesterone, 11α-acetoxyprogesterone, and progesterone, respectively, for the 11-ketoprogesterone as starting steroid in the above-described reaction.

To a stirred solution of 4.50 grams (0.01 mole) of the sodium enolate of 11-keto-21-ethoxyoxalylprogesterone and two grams of potassium acetate in 150 milliliters of methanol was added dropwise 3.09 grams (1.00 ml.; 0.0193 mole) of bromine. When the addition was complete, 3.24 grams (0.06 mole) of sodium methoxide in forty milliliters of methanol was added thereto, whereafter the whole was maintained at about 25 degrees centigrade for sixteen hours. The reaction mixture was then mixed with a large volume of water and the whole was extracted successively with one portion of benzene and two portions of methylene chloride. The combined extracts were dried over anhydrous sodium sulfate and the solvent was then removed therefrom by distillation. The residue was dissolved in 100 milliliters of methylene chloride and chromatographed over and eluted from 150 grams of Florisil synthetic magnesium silicate with methylene chloride containing increasing amounts of acetone. The methylene chloride plus five percent acetone eluates contained 1.2 grams of 3,11-diketo-4,17(20)-pregnadiene-21-oic acid methyl ester, melting at 155 to 188 degrees centigrade. Crystallization of these crystals from a mixture of acetone plus Skellysolve B hexane hydrocarbons gave crystals melting at 207 to 212 degrees centigrade.

Similarly, substituting the sodium enolate of 11α-hydroxy-21-ethoxyoxalylprogesterone for the sodium enolate of 11-keto-21-ethoxyoxalylprogesterone used in the reaction described above is productive of methyl 3-keto-11α-hydroxy-4,17(20)-pregnadiene-21-oate. The sodium enolate of 21-ethoxyoxalylprogesterone is similarly converted to methyl 3-keto-4,17(20)-pregnadiene-21-oate.

PREPARATION 2

*3-ethylene glycol ketal of 3,11-diketo-4,17(20)-pregnadiene-21-oic acid methyl ester*

To a solution of 1.5 grams (0.0042 mole) of 3,11-diketo-4,17(20)-pregnadiene-21-oic acid methyl ester dissolved in 150 milliliters of benzene was added 7.5 milliliters of ethylene glycol and 0.150 gram of para-toluene-sulfonic acid and the whole was then heated with stirring at the reflux temperature of the reaction mixture for 5.5 hours. The cooled reaction mixture was washed with 100 milliliters of a one percent aqueous sodium bicarbonate solution. The benzene layer was then poured on a column of 150 grams of Florisil synthetic magnesium silicate. The column was developed with 100 milliliter portions of solvents of the following composition and order: eight portions of methylene chloride and three portions of methylene chloride plus four percent acetone. The methylene chloride eluates contained 1.08 grams of the 3-ethylene glycol ketal of 3,11-diketo-4,17(20)-pregnadiene-21-oic acid methyl ester, which upon recrystallization from a mixture of ethyl acetate and Skellysolve B hexane hydrocarbons melted at 188 to 190 degrees centigrade and had the analysis given below. The methylene chloride plus four percent acetone eluates contained 0.390 gram of pure starting 3,11-diketo-4,17(20)-pregnadiene-21-oic acid methyl ester. The yield of product was 87 percent of the theoretical calculated on the amount of starting steroid which reacted.

*Analysis.*—Calculated for $C_{24}H_{32}O_5$: C, 71.94; H, 8.05. Found: C, 71.90; H, 7.95.

Substituting methyl 3-keto-11α-hydroxy-4,17(20)-pregnadiene-21-oate for the methyl 3,11-diketo-4,17(20)-pregnadiene-21-oate as starting steroid in the reaction described above is productive of the 3-ethylene glycol ketal of methyl 3-keto-11α-hydroxy-4,17(20)-pregnadiene-21-oate. Methyl 3-keto-4,17(20)-pregnadiene-21-oate is similarly converted to the 3-ethylene glycol ketal of methyl 3-keto-4,17(20)-pregnadiene-21-oate.

PREPARATION 3

*3-ethylene glycol ketal of 11β,21-dihydroxy-4,17(20)-pregnadiene-3-one*

A solution of 1.50 grams of the 3-ethylene glycol ketal of 3,11-diketo-4,17(20)-pregnadiene-21-oic acid methyl ester in seventy milliliters of benzene was added dropwise to a stirred mixture of 1.50 grams of lithium aluminum hydride and fifty milliliters of anhydrous ether. When addition was complete, the reaction mixture was refluxed for one-half hour whereafter the mixture was cooled to room temperature. Fifty milliliters of water was then cautiously added to the stirred reaction mixture to decompose the excess lithium aluminum hydride, followed by 200 milliliters of methylene chloride. The whole was then centrifuged to facilitate separation of the organic and aqueous phases. The organic phase was separated, the solvent distilled and the white crystalline distillation residue was crystallized from a mixture of ethyl acetate and Skellysolve B hexane hydrocarbons to yield 1.003 grams, a yield of 72 percent of the theoretical, of crystalline 3-ethylene glycol ketal of 11β,21-dihydroxy-4,17(20)-pregnadiene-3-one in two crops. The first crop, the analysis of which is given below, melted at 191 to 194 degrees centigrade and the second, at 172 to 180 degrees centigrade.

*Analysis.*—Calculated for $C_{23}H_{34}O_4$: C, 73.76; H, 9.15. Found: C, 73.87; H, 9.22.

Substituting the 3-ethylene glycol ketal of methyl 3-keto-11α-hydroxy-4,17(20)-pregnadiene-21-oate as the starting steroid in the above-described reaction is productive of the 3-ethylene glycol ketal of 11α,21-dihydroxy-4,17(20)-pregnadiene-3-one. The 3-ethylene glycol ketal of methyl 3-keto-4,17(20)-pregnadiene-21-oate is similarly converted to the 3-ethylene glycol ketal of 21-hydroxy-4,17(20)-pregnadiene-3-one.

PREPARATION 4

*11β,21-dihydroxy-4,17(20)-pregnadiene-3-one*

A solution of 0.572 gram (0.0015 mole) of the 3-ethylene glycol ketal of 11β,21-dihydroxy-4,17(20)-pregnadiene-3-one in forty milliliters of acetone was diluted with water to a volume of fifty milliliters and eight drops of concentrated sulfuric acid was then added thereto, whereafter the reaction mixture was kept at room temperature for 24 hours. The reaction mixture was then made alkaline by the addition of a saturated aqueous sodium bicarbonate solution and the acetone was then evaporated from the mixture. Methylene chloride and more water were then added, the methylene chloride layer removed, and the solvent distilled therefrom. The residue, after drying in vacuo, consisted of the theoretical 0.518 gram of 11β,21-dihydroxy-4,17(20)-pregnadiene-3-one.

Substituting the 3-ethylene glycol ketal of 11α,21-dihydroxy-4,17(20)-pregnadiene-3-one as the starting steroid in the above-described reaction is productive of 11α,21-dihydroxy-4,17(20)-pregnadiene-3-one. The 3-ethylene glycol ketal of 21-hydroxy-4,17(20)-pregnadiene-3-one is similarly hydrolyzed to 21-hydroxy-4,17(20)-pregnadiene-3-one.

PREPARATION 5

*11β-hydroxy-21-acetoxy-4,17(20)-pregnadiene-3-one*

A solution of 0.518 gram of 11β,21-dihydroxy-14(20)-pregnadiene-3-one in five milliliters of pyridine was mixed with two milliliters of acetic anhydride and the whole was then maintained at room temperature for seventeen hours whereafter crushed ice was added thereto. The precipitated 11β-hydroxy-21-acetoxy-4,17(20)-pregnadiene-3-one was filtered therefrom, dissolved in benzene and then chromatographed over a column of 75 grams of Florisil synthetic magnesium silicate. The column was developed with 75-milliliter portions of solvents of the following composition and order: benzene, three portions each of Skellysolve B hexane hydrocarbons plus one percent acetone, Skellysolve B plus five percent acetone, Skellysolve B plus ten percent acetone, Skellysolve B plus fifteen percent acetone, Skellysolve B plus twenty percent acetone, and finally, two portions of acetone. The eluate fractions containing ten percent and fifteen percent acetone, respectively, were combined, the solvent removed therefrom, and the crystalline residue was crystallized from a mixture of ethyl acetate and Skellysolve B to yield as the first crop 0.253 gram, a yield of 45 percent of the theoretical, of 11β-hydroxy-21-acetoxy-4,17(20)-pregnadiene-3-one melting at 183 to 186 degrees centigrade.

*Analysis.*—Calculated for $C_{23}H_{32}O_4$: C, 74.16; H, 8.66. Found: C, 74.18, 73.95; H, 8.45, 8.74.

Similarly, esterifying 21-hydroxy-4,17(20)-pregnadiene-3-one in the manner described above with acetic anhydride is productive of 21-acetoxy-4,17(20)-pregnadiene-3-one. 11α-hydroxy-21-acetoxy-4,17(20)-pregnadiene-3-one and 11α,21-diacetoxy-4,17(20)-pregnadiene-3-one, respectively, are similarly prepared by reacting about a molar equivalent and a large molar excess of acetic anhydride, respectively, in the manner described above with 11α,21-dihydroxy-4,17(20)-pregnadiene-3-one.

Other esters of 11α,21-dihydroxy-4,17(20)-pregnadiene-3-one, 11β,21-dihydroxy-4,17(20)-pregnadiene-3-one and 21-hydroxy-4,17(20)-pregnadiene-3-one are prepared by substituting other acid anhydrides or acid chlorides in the reaction described above, e. g., propionic anhydride, benzoyl chloride, phthalic anhydride, succinic anhydride, oxalyl chloride, trimethylacetyl chloride, cyclopentylpropionyl chloride, diethylacetyl chloride, phenylpropionyl chloride, and the like. The formate esters are ordinarily prepared using about 98 percent formic acid and an esterification catalyst. Esters of 21-hydroxy-4,17(20)-pregnadiene-3,11-dione are prepared by the oxidation of the corresponding ester of 11β,21-dihydroxy-4,17(20)-pregnadiene-3-one with chromic acid under mild conditions.

EXAMPLE 1

*Oxygenation with phenyliodosoacetate*

To a solution of 1.116 grams (3.0 millimoles) of 11β-hydroxy-21-acetoxy-4,17(20)-pregnadiene-3-one, dissolved in sixty milliliters of tertiary butyl alcohol and 1.5 milliliters of pyridine was added, at 25 degrees centigrade, five milliliters of tertiary butyl alcohol containing 11.1 milligrams (0.044 millimole) of osmium tetroxide and 0.2 milliliter (0.11 millimole) of water. To the solution was then added 2.4 grams (7.5 millimoles) of phenyliodosoacetate, which completely dissolved within twenty minutes. In approximately 1.25 hours at 25 degrees centigrade, one-half the phenyliodosoacetate had been consumed in the reaction as determined by titration of five milliliter aliquot portions with sodium thiosulfate indicating a reaction time necessary to obtain a substantially complete reaction, of about three to four hours. When the reaction was complete, twenty milliliters of water was added to the reaction mixture and then distilled at reduced pressure to a volume of about twenty milliliters. An additional twenty milliliters of water was added to the residue and the mixture thoroughly extracted with ethylene chloride. The extracts were dried and chromatographed over eighty grams of Florisil synthetic magnesium silicate, which was developed with ethylene chloride containing increasing amounts of acetone. The two liters of ethylene chloride eluates containing three and four percent, respectively, of acetone eluted 82.7 milligrams (7.1 percent) of starting steroid, and 91 milligrams (ten percent) of 11β-hydroxy-4-androstene-3,17-dione. Three liters of ethylene chloride plus seven percent acetone eluted 822 milligrams (67.7 percent) of 11β,17α-dihydroxy-21-acetoxy-4-pregnene-3,20-dione. One liter of ethylene chloride plus twenty percent acetone eluted 171 milligrams (fourteen percent calculated as 11β,17α,20-trihydroxy-21-acetoxy-4-pregnene-3-one) of more polar steroid.

EXAMPLES 2 TO 10
Oxygenation with phenyliodosoacetate

Following the procedure described in Example 1, nine reactions were performed, with variations in the reactants. In Examples 2 to 4, the effect of water was determined; in Examples 5 to 8, the effect of pyridine; and in Examples 9 and 10, the effect of the concentration of osmium. Generally speaking, the yield of hydrocortisone acetate was not substantially affected by variations in the amounts of these reactants employed. The use of large amounts of pyridine somewhat increased the yield of hydrocortisone acetate with a slight reduction in yield of by-products while the use of low concentrations of osmium tetroxide or no added water greatly increased the reaction time required to achieve complete reaction. The proportions of these reactants and the yields of products obtained in these examples are shown in Table II below.

dried in vacuo. There was obtained 895 milligrams of product which consisted of 74 percent hydrocortisone acetate. The yield of hydrocortisone acetate, based upon the starting steroid, was 61 percent of the theoretical. The other steroidal products of the reaction were also obtained in lesser amounts.

A 42 percent yield of hydrocortisone acetate was obtained when the reaction was performed under similar conditions in glacial acetic acid.

EXAMPLE 13
Oxygenation with iodoxybenzene

A solution of one gram (2.9 millimoles) of 11β-hydroxy-21-acetoxy-4,17(20)-pregnadiene-3-one in 25 milliliters of acetic acid containing five milliliters of water was stirred overnight with twenty milligrams (0.08 millimole) of osmium tetroxide and 730 milligrams (3.1 millimoles) of iodoxybenzene at room temperature. The initially insoluble iodoxybenzene slowly dissolved during this time. The mixture was poured into aqueous sodium sulfite and the resulting mixture extracted thoroughly with methylene chloride. The extract was washed with cold sodium bicarbonate, water and finally dried. Evaporation of the dry extract left a residue which assayed fifty percent starting material, twenty percent hydrocortisone acetate and 25 percent 11β,17α,20-trihydroxy-21-acetoxy-4-pregnene-3-one.

TABLE II

| Example | Percent pyridine by Vol. | Percent water by Vol. | Percent OSO$_4$ by weight (Calc. on steroid) | Reaction Half-life (Hours) | Yield (Percent) | | | |
|---|---|---|---|---|---|---|---|---|
| | | | | | Starting steroid | 17-ketone | hydrocortisone acetate | more polar steroid |
| 2 | 2.2 | 1.5 | 1.0 | 0.5 | 8.6 | 7.2 | 65 | 12.5 |
| 3 | 2.2 | 0.75 | 1.0 | 1.0 | (¹) | (¹) | (¹) | (¹) |
| 4 | 2.2 | 0.3 | 1.0 | 1.25 | 7.1 | 10.0 | 67.7 | 14 |
| 5 | none | 0.8 | 1.0 | 3.0 | 7.9 | 20.0 | 55 | 16 |
| 6 | 0.72 | 0.8 | 1.0 | 0.8 | 8.0 | 10.0 | 59 | 12.5 |
| 7 | 2.2 | 0.75 | 1.0 | 1.0 | (²) | (²) | (²) | (²) |
| 8 | 7.2 | 0.8 | 1.0 | 1.8 | 11.8 | 8.0 | 63 | 9.5 |
| 9 | 0.88 | 0.5 | 0.2 | 5.25 | 15.5 | 10.5 | 60 | 9.1 |
| 10 | 0.88 | 0.5 | 0.1 | 4.0 | 16.5 | 11.0 | 58.3 | 9.7 |

¹ 54% hydrocortisone acetate by direct crystallization.
² Yield not determined.
The reaction temperature in Example 10 was 45 degrees centigrade.

EXAMPLE 11
Oxygenation with phenyliodosoacetate

Following the procedure described in Example 1, three millimoles of 11β-hydroxy-21-acetoxy-4,17(20)-pregnadiene-3-one was oxygenated by reaction with 0.054 millimole of osmium tetroxide and six millimoles of phenyliodosoacetate at room temperature in thirty milliliters of acetic acid containing six milliliters of water. There was obtained a 48 percent yield of hydrocortisone acetate as well as lesser amounts of the other products described in Example 1.

EXAMPLE 12
Oxygenation with iodosobenzene

To a mixture of one gram (2.66 millimoles) of 11β-hydroxy-21-acetoxy-4,17(20)-pregnadiene-3-one and 1.5 milliliters of pyridine in fifty milliliters of tertiary butyl alcohol was added fifty milligrams (0.2 millimole) of osmium tetroxide followed by 1.2 grams (5.5 millimoles) of iodosobenzene. The iodosobenzene slowly went into solution. The mixture was stirred for eighteen hours and twenty milliliters of a 0.5 percent aqueous solution of sodium sulfite was then added, the mixture concentrated to 25 milliliters by distillation at reduced pressure, water added and the mixture distilled once more at reduced pressure to a volume of 25 milliliters. The residue was refrigerated for three hours, filtered and

EXAMPLE 14
Oxygenation with iodosobenzene

Following the procedure described in Example 12, 21-acetoxy-4,17(20)-pregnadiene-3,11-dione is oxygenated with a catalytic amount of osmium tetroxide in the presence of two molar equivalents of iodosobenzene, calculated on the starting steroid, to produce 17α-hydroxy-21-acetoxy-4-pregnene-3,11,20-trione (cortisone acetate).

EXAMPLE 15
Oxygenation with phenyliodosoacetate

Following the procedure described in Example 1, 21-acetoxy-4,17(20)-pregnadiene-3-one is oxygenated with a catalytic amount of osmium tetroxide in the presence of two molar equivalents of phenyliodosoacetate, calculated on the starting steroid, to produce 17α-hydroxy-21-acetoxy-4-pregnene-3,20-dione (Compound S acetate).

EXAMPLE 16
Oxygenation with iodoxybenzene

Following the procedure described in Example 13, 11α-hydroxy-21-acetoxy-4,17(20)-pregnadiene-3-one is oxygenated with a catalytic amount of osmium tetroxide in the presence of a molar equivalent of iodoxybenzene, calculated on the starting steroid to produce 11α,17α-dihydroxy-21-acetoxy-4-pregnene-3,20-dione (11-epihydrocortisone acetate).

Following the procedure described in the preceding example the 9-fluoro and 9-chloro analogs of the starting compounds described herein are similarly converted to the corresponding 9-chloro- and 9-fluoro-17α-hydroxy-20-keto steroids.

Similarly, oxygenations such as described in the preceding examples may be performed employing, instead of pyridine as catalyst for increasing the reaction rate, an amine oxide, i. e., amine oxides of N-heterocyclic aromatic amines, alkylamines, alkyl carbocyclic aromatic amines, and ethanolamines, e. g., pyridine oxide, picoline oxide, collidine oxide, trimethylamine oxide, triethylamine oxide, N-methylmorpholine oxide, morpholinoethanol oxide, triethanolamine oxide, dimethylaminoethanol oxide, and especially N-methylmorpholine oxide.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. In a process for the production of a 17α-hydroxy-20-keto compound of the pregnane series by the oxidative hydroxylation of a $\Delta^{17(20)}$ compound of the pregnane series having a 20-hydrogen atom and a 21-carbon atom with osmium tetroxide and an oxidizing agent, the improvement which comprises carrying out the oxidative hydroxylation with from about 0.001 to about 0.2 molar equivalents of osmium tetroxide and in excess of two molar equivalents of an organic carbocyclic aryl polyvalent iodo oxide as the oxidizing agent, calculated on the starting steroid, at a temperature between about minus ten and about plus seventy degrees centigrade.

2. The process of claim 1 wherein the $\Delta^{17(20)}$-steroid is a $\Delta^{17(20)}$-21-acyloxy steroid of the pregnane series wherein acyl is the acyl radical of an organic carboxylic acid having from one to eight carbon atoms, inclusive.

3. The process of claim 1 wherein the organic carbocyclic aryl polyvalent iodo oxide is an iodoso compound.

4. The process of claim 1 wherein the organic carbocyclic aryl polyvalent iodo oxide is an acid salt of an iodoso compound.

5. The process of claim 1 wherein the organic carbocyclic aryl polyvalent iodo oxide is an iodoxy compound.

6. The process of claim 1 wherein the $\Delta^{17(20)}$-steroid is represented by the following formula:

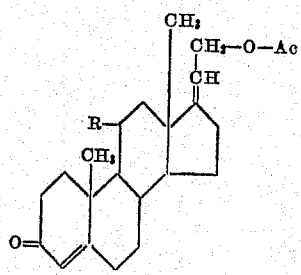

wherein R is selected from the group consisting of hydrogen, α-hydroxyl, β-hydroxyl and ketonic oxygen and wherein Ac represents the acyl radical of an organic carboxylic acid having from one to eight carbon atoms, inclusive.

7. A process for the production of a 17α-hydroxy-20-keto steroid which comprises: reacting 21-acyloxy-4,17(20)-pregnadiene-3,11-dione, wherein acyl is the acyl radical of an organic carboxylic acid having from one to eight carbon atoms, inclusive, with less than one molar equivalent of osmium tetroxide and with at least two oxidation equivalents of an organic carbocyclic aryl polyvalent iodo oxide and separating the resulting 17α-hydroxy-21-acyloxy-4-pregnene-3,11,20-trione from the reaction mixture.

8. The process of claim 7 wherein less than 0.2 molar equivalent of osmium tetroxide is employed.

9. The process of claim 7 wherein the acyloxy group is acetoxy.

10. A process for the production of a 17α-hydroxy-20-keto steroid which comprises: reacting 11β-hydroxy-21-acyloxy-4,17(20)-pregnadiene-3-one, wherein acyl is the acyl radical of an organic carboxylic acid having from one to eight carbon atoms, inclusive, with less than one molar equivalent of osmium tetroxide and at least two oxidation equivalents of an organic carbocyclic aryl polyvalent iodo oxide, and separating the resulting 11β,17α-dihydroxy-21-acyloxy-4-pregnene-3,20-dione from the reaction mixture.

11. The process of claim 10 wherein less than 0.2 molar equivalent of osmium tetroxide is employed.

12. The process of claim 10 wherein the acyloxy group is acetoxy.

13. A process for the production of a 17α-hydroxy-20-keto steroid which comprises: reacting 21-acyloxy-4,17(20)-pregnadiene-3-one, wherein acyl is the acyl radical of an organic carboxylic acid having from one to eight carbon atoms, inclusive, with less than a molar equivalent of osmium tetroxide and at least two oxidation equivalents of an organic carbocyclic aryl polyvalent iodo oxide, and separating the resulting 17α-hydroxy-21-acyloxy-4-pregnene-3,20-dione from the reaction mixture.

14. The process of claim 13 wherein less than 0.2 molar equivalent of osmium tetroxide is employed.

15. The process of claim 13 wherein the acyloxy group is acetoxy.

16. A process for the production of 11β,17α-dihydroxy-21-acyloxy-4-pregnene-3,20-dione which comprises: reacting 11β-hydroxy-21-acyloxy-4,17(20)-pregnadiene-3-one, wherein acyl is the acyl radical of an organic carboxylic acid having from one to eight carbon atoms, inclusive, with less than 0.05 molar equivalent of osmium tetroxide and between about two and about 2.75 oxidation equivalents of an organic carbocyclic aryl polyvalent iodo oxide selected from the group consisting of iodoso compounds, acid salts thereof and iodoxy compounds and separating the resulting 11β,17α-dihydroxy-21-acyloxy-4-pregnene-3,20-dione from the reaction mixture.

17. The process of claim 16 wherein the starting steroid is 11β-hydroxy-21-acetoxy-4,17(20)-pregnadiene-3-one.

18. The process of claim 16 wherein the organic carbocyclic aryl polyvalent iodo oxide is a phenyl iodoso compound.

19. The process of claim 16 wherein the organic carbocyclic aryl polyvalent iodo oxide is phenyl iodosoacetate.

20. The process of claim 16 wherein the organic carbocyclic aryl polyvalent iodo oxide is iodosobenzene.

References Cited in the file of this patent

UNITED STATES PATENTS

| | | |
|---|---|---|
| 2,493,780 | Sarett | Jan. 10, 1950 |
| 2,668,816 | Miescher | Feb. 9, 1954 |
| 2,773,076 | Reichstein | Dec. 4, 1956 |

OTHER REFERENCES

Fieser et al.: Natural Products Related to Phenanthrene, 3rd ed., pages 424–26 (1949).

UNITED STATES PATENT OFFICE
CERTIFICATE OF CORRECTION

Patent No. 2,875,217                                                             February 24, 1959

William P. Schneider

It is hereby certified that error appears in the printed specification of the above numbered patent requiring correction and that the said Letters Patent should read as corrected below.

Column 7, line 63, for "-ketoprogesternone" read -- -ketoprogesterone --; column 9, line 69, for "-14(20)-" read -- -4,17(20)- --.

Signed and sealed this 28th day of July 1959.

(SEAL)

Attest:

KARL H. AXLINE                                                         ROBERT C. WATSON
Attesting Officer                                                     Commissioner of Patents